Dec. 6, 1955   M. L. LOCKHART   2,725,683
METHOD OF BLOWING HOLLOW GLASS VIALS
Filed Jan. 26, 1953
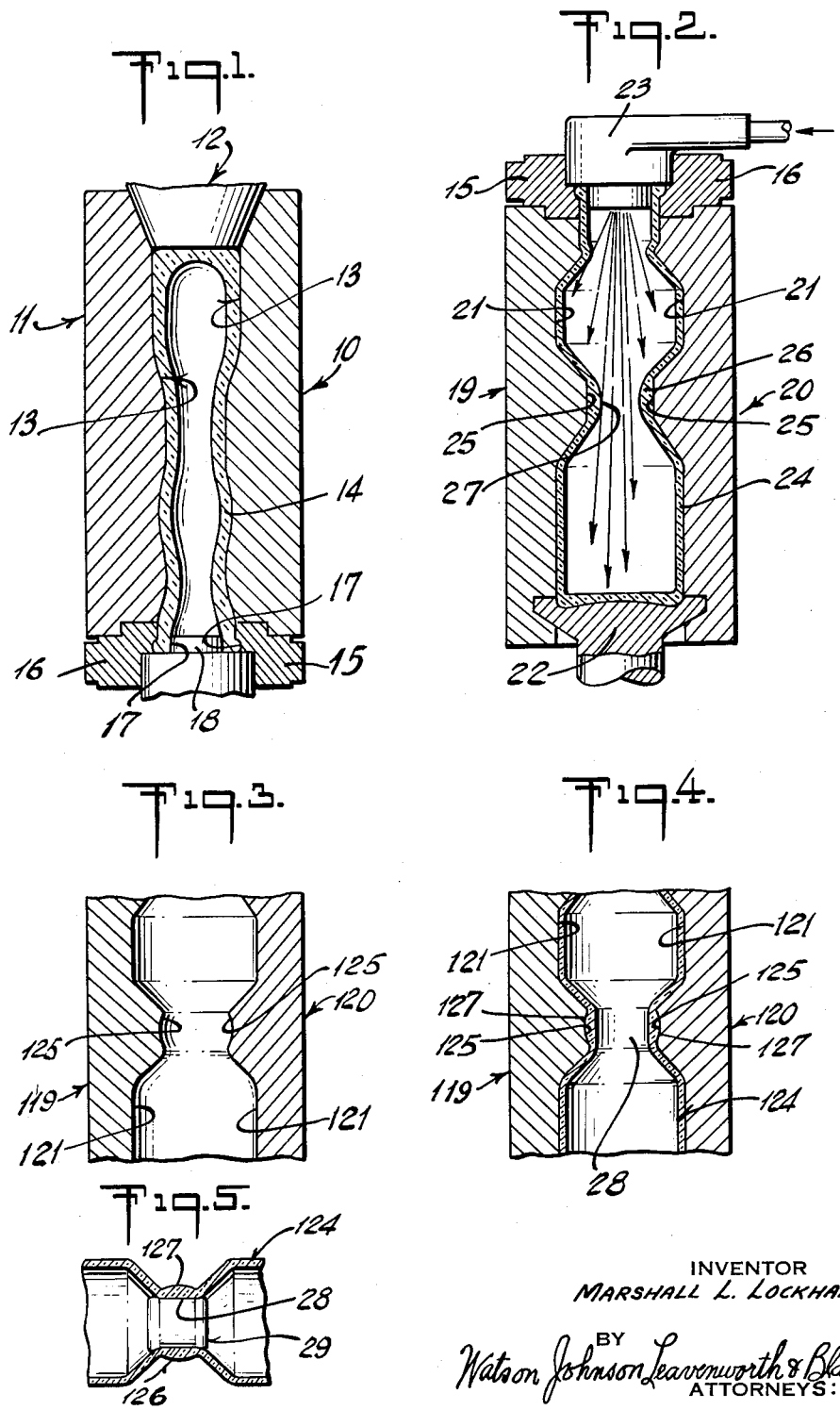
INVENTOR
MARSHALL L. LOCKHART
BY
Watson Johnson Leavenworth & Blair
ATTORNEYS

United States Patent Office 2,725,683
Patented Dec. 6, 1955

2,725,683

METHOD OF BLOWING HOLLOW GLASS VIALS

Marshall L. Lockhart, Rutherford, N. J., assignor to The Compule Corporation, Rutherford, N. J., a corporation of New Jersey Application January 26, 1953, Serial No. 333,123

1 Claim. (Cl. 49—80)

The present invention relates to a method of blowing hollow glass vials in mold cavities.

A general object of the present invention is to provide such method which may be readily and economically practised on a commercial basis efficiently to form a substantially flat, elongated cylindrical internal surface in a constricted waist portion of a hollow glass vial which is blown in a mold cavity.

A more specific object of the present invention is to provide a method of blowing hollow glass vials in mold cavities with formation of waist constrictions while assuring that the natural or inherent tendency of molten glass to flow in a curve and to convex over an obstruction will be accommodated to the exterior of the vials to permit relatively cylindrical rather than hyperbolic surfaces to be formed in the constrictions by the flowing of molten glass attendant upon the blowing.

Another object of the present invention is to provide such a method dependent upon the use of finishing cavity mold means characterized by concave surfaces where there is tendency to form interior convex wall thickening while blowing hollow glass vials therein so as to assure attainment of substantially true cylindrical internal surfaces where desired without the use of shaping core dies.

A further object of the present invention is to provide a practical procedure which may be efficiently carried out allowing effective use and practice thereof to form substantially flat rather than convexed internal plug or cork seating surfaces in waist constrictions of blown glass vials.

Other objects of the invention will in part be obvious and will in part appear hereinafter.

The invention accordingly comprises the several steps and the relation of the one or more of such steps with respect to each of the others, as exemplified in the following detailed disclosure, and the scope of the invention will be indicated in the claim.

For a fuller understanding of the nature and objects of the invention, reference should be had to the following detailed description taken in connection with the accompanying drawing, in which:

Fig. 1 is an axial section, with parts broken away, of a typical embodiment of sectioned blank or parison mold structure designed as part of blowing apparatus to produce certain types of glass vials having waist constrictions, showing certain parts in elevation and illustrating in section a cavitied parison formed therein;

Fig. 2 is an axial section, with parts broken away, of typical finishing blow mold structure to which the parison, formed by the Fig. 1 blank mold, may be transferred for finish blowing, illustrating in elevation blowing nozzle means suitable for use in puff blowing a glass vial therein, and indicating by a sectioned showing of the blow vial inherent internal convex wall thickening at a waist constriction characteristic of prior practices;

Fig. 3 is a sectional view similar to Fig. 2, but with parts broken away, of sectioned mold structure modified in accordance with the teachings of the present invention;

Fig. 4 is a sectional view similar to Fig. 2, but with parts broken away, illustrating the results attainable by practise of the present invention; and Fig. 5 is an axial section of that portion of the blown vial illustrated in Fig. 4, showing advantageous use of the substantially flat, elongated cylindrical internal constriction surface as a seat for a gate plug or cork.

Prior to the present invention, glass vials of the type illustrated in my prior patent No. 2,610,628 have been blown in sectioned cavity mold apparatus constructed along the lines of and operating similar to apparatus disclosed in United States patents to Johnson No. 2,125,789 and Wadman No. 2,151,876. While such procedures and apparatus are suitable for producing such vials characterized by waist constrictions, it has been found that the narrow zone or line contact between the vial constriction seat and the gate plug may at times permit sufficient passage of moisture from the liquid chamber to the solids chamber so as deleteriously to affect the solids in the latter, particularly during an initial storage period. I have found that such moisture creepage results from minute surface fissures in the internal surfaces of the glass vials which eventually will be blocked off after a lengthy storage period by setting of the elastic material of the gate plug therein. However, when such devices are used for the packaging and distribution of segregated ingredients of medicinal preparations, it becomes important to assure that such creepage be effectively minimized or substantially eliminated at any time after the loading of the materials in the devices. Attempts to accomplish this end included the formation of wider seats by greatly increasing the length of the waist constrictions in the vial walls. It was found, however, that due to inherent characteristics of so blowing such vials and the surface tension of the metal or molten glass, the internal seating surfaces were convexed or hyperbolically shaped, as is illustrated in Fig. 2. Such hyperbolic seats may require careful complementary shaping of the side walls of the elongated elastic gate plugs to attain fluid-tight surface contact of appreciable extent to secure a minimal creepage. These problems have been efficiently solved by the method of the present invention whereby substantially longitudinally flat, elongated cylindrical internal plug seat surfaces may be efficiently attained with accommodation of the inherent convex wall thickening to the exteriors of the vials.

Referring to the drawings, in which like numerals identify similar parts throughout, it will be seen that a typical cavity mold blowing apparatus may include a sectioned blank or parison mold comprising body halves 10 and 11 and a combined settle blow head and counterflow baffle 12 closing the funnel opening in the top end of the mold. As shown in Fig. 1, each half-section 10 and 11 of the blank mold is provided with a body recess 13, with those two recesses together forming the mold cavity in which the vial blank or cavitied parison 14 is to be formed in accordance with established practice well understood in the art. The mouth of the blank mold may be fitted with suitable sectioned neck ring halves 15 and 16 having like recesses 17 together to shape at least the mouth and a portion of the neck of the vial.

In accordance with usual cavity mold blowing procedure, a charge of molten glass of measured quantity is suitably fed through the funnel opening in the top of the blank mold 10, 11 into the cavity 13, 13 closed at its bottom by neck pin structure 18, equipped with suitable counterblowing means and fitted into the sectioned neck ring 15, 16 as shown in Fig. 1. After a small cavity is formed in the bottom of the charge by counterblowing the settle blow head 12 is lowered into the funnel feed opening and settle blowing is then performed. Then counterblowing pressure is admitted through neck pin structure 18 to expand the molten glass to conformity with the blank mold cavity 13, 13. The parison or blank mold sections 10 and 11 are then removed from the blown cavitied parison 14 and after the latter has been reheated in known suitable manner it may be transferred by the neck ring 15, 16 to the cavity of a suitable sectioned blow mold for finishing the blowing of the vial. As shown in Fig. 2 such a blow mold may comprise sections 19 and 20, each having a body recess 21, and a shaped bottom closure or plate 22 interfitted therewith, together to form the blow mold cavity. Blow nozzle 23 is fitted to the neck of the reheated parison in the mold 19, 20 and 22, and delivers a blast or puff of gaseous medium to the parison cavity. As a result, the molten glass of the parison is expanded to conform to the mold cavity to produce the vial 24.

It will be noted from Fig. 2 that the cavity in blow mold 19, 20 and 22 is provided with a waist constriction; formed by cooperating, matching, semi-circular, transverse land sections 25, 25. The waist constriction preferably is of appreciable longitudinal dimension and for this purpose the circular land comprising its sections 25, 25 has a relatively wide cylindrical inside face in order to provide in the vial 24 an elongated internal waist constriction surface or gate plug seat. When the molten glass of the relatively thick-walled hollow or cavitied parison 14 shown is swelled by puff blowing to fill the cavity 21, 21 of the finishing blow mold it is flowed over the cavity walls and the surfaces of the land sections 25, 25. This flowing and the surface tension of the molten glass causes the waist constriction 26 in the vial 24 to have an internal hyperbolic surface 27. This convex thickening of the walls of the vial in its waist constriction 26 is inherently characteristic of such puff blowing procedure.

In accordance with the present invention, as illustrated in Fig. 3, a finishing blow mold is employed to take thick-wall cavitied parison 14 which may be similar to that illustrated in Fig. 2. In this finishing mold the relatively wide inside face of the circular land formed by semi-circular sections 125, 125 and cooperatively defining the waist constriction is concaved, as shown, to transfer such inherent convex wall thickening to the exterior of the blown vial. As therein suggested, each of the blow mold sections 119 and 120 may have its cavity 21, 21 provided with relatively wide semi-circular, matching land sections 125, 125, the faces of which are longitudinally concaved and outwardly curved to an appreciable degree sufficient to accommodate the inherent convex wall thickening. This provides a relatively wide and shallow, outwardly-curved and concaved annular groove in the circular inside face of the land formed by its matching sections 125, 125, which groove is of a shape conversely similar to inherent internal convex thickening of the vial walls in the constricted waist portion 26 attainable with the relatively wide circular land defined by its sections 25, 25 when provided with a substantially cylindrical internal surface or inside face in the absence of such a groove, all as taught in Fig. 2. As shown in Fig. 4, when a glass vial 124 is blown by similar procedure into the body cavity of the sectioned finishing blow mold 119, 120 of Fig. 3, with the use of a suitable cavitied parison such as 14, the inherent convex wall thickening at the waist constriction is formed on the exterior surfaces or transferred to the exterior of the vial, as illustrated at 127. The molten glass of the thick-walled parison 14 is thickly flowed by such puff blowing over the mold cavity walls and the grooved circular land comprising sections 125, 125 with complete filling of the concaved annular groove whereby the inherent convex thickening is accommodated by the formation on the exterior of the waist constriction of the vial of a slightly convexed wide and low bead complemental to the land groove, as indicated at 127. As a result, the elongated internal constriction, which may be utilized as a seat for a gate plug or a cork, will be a relatively wide, substantially flat and desirably cylindrical plug seating surface, as illustrated at 28 in Fig. 4. Thus, in accordance with the teachings of the present invention, the production of an importantly desirable, elongated, truly cylindrical internal constriction surface is attainable in a surprisingly simple but sure manner as has been proven in commercial practice.

It will be seen from Fig. 5 that the substantially flat, elongated cylindrical internal surface 28 of the vial waist constriction 126 provides an elongated seat for an elongated, oversized, elastic cylindrical gate plug 29 which when compressively forced thereinto, will have liquid-type contact over a wide zone which has been found effectively to eliminate the remarked creepage or at least minimize it to an amount of no consequence. The gate plug 29, illustrated in Fig. 5, is desirably longer than the cylindrical seating surface 28 which accounts for the indicated expansive bulging of both ends thereof. However, if desired, such gate plug structure may be initially in the form of a spool having a cylindrical mid-section and flared ends so as to fit the seat in similar fashion.

It will thus be seen that the flow of glass in the walls of the hollow or cavity parison 14 with puff blowing thereof in a finishing cavity mold having an abrupt waist constriction and the surface tension of the parison molten glass will inherently form a convex wall thickening of the hollow glass body at its waist constriction. This inherently formed convex wall thickening is caused by practice of the present invention to form on the exterior wall of the hollow glass body at its waist constriction to cause the interior wall of the waist constriction of the hollow glass body to take the shape of an elongated cylindrical internal seating surface as illustrated in Figs. 4 and 5; and that this is brought about by puff blowing the cavity parison in a finishing cavity mold having the inside surface of its waist constriction concaved in the form of an outwardly-curved annular groove 125 as shown in Figs. 3 and 4. The desired elongated cylindrical internal seating surface is thus uniquely formed solely by a blowing operation without necessitating employment of an internal or core die or plunger-forming element to press the molten glass at the waist constriction to the desired final shape illustrated in Figs. 4 and 5.

It will thus be seen that the objects set forth above, among those made apparent from the preceding description, are efficiently attained and, since certain changes in carrying out the above process which embodies the invention, may be made without departing from its scope, it is intended that all matter contained in the above description or shown in the accompanying drawing shall be interpreted as illustrative and not in a limiting sense.

It is also understood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

In the manufacture of a relatively thick-walled hollow glass vial having an elongated constricted waist portion provided with a substantially cylindrical, longitudinally-flat, elongated internal plug seat surface the process of blowing said vial with simultaneous blowing and flowing formation of said elongated, substantially cylindrical plug seat surface comprising; providing the finishing mold with a cavity having a waist constriction forming a relatively wide circular abrupt land to shape the elongated constricted waist portion of said vial; said relatively wide circular land having in its circular inside face a relatively wide and shallow, outwardly-curved and concaved, annular groove of appropriate shape; locating in the mold cavity a cavitied glass parison having a wall of substantially uniform thickness; and puff blowing the parison to flow the molten glass over the mold cavity walls and said grooved circular abrupt land with complete filling of the concaved annular groove whereby inherent convex thickening of the walls of the blown vial in its constricted waist portion forms a slightly convexed wide and low bead complemental to said groove and said substantially cylindrical plug seat therewith.

References Cited in the file of this patent

UNITED STATES PATENTS

| | | | |
|---|---|---|---|
| Re. 23,564 | Hobson | Oct. 14, | 1952 |
| 299,318 | Atterbury | May 24, | 1886 |
| 344,500 | Schrader | June 29, | 1886 |
| 424,524 | Washington | Apr. 1, | 1890 |
| 533,623 | Ulfig | Feb. 5, | 1895 |